(12) United States Patent
Li (10) Patent No.: US 10,931,937 B2
(45) Date of Patent: Feb. 23, 2021

(54) DISPLAY APPARATUS AND A METHOD THEREOF (71) Applicant: BOE TECHNOLOGY GROUP CO., LTD., Beijing (CN)

(72) Inventor: Zhongxiao Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 371 days.

(21) Appl. No.: 15/768,278

(22) PCT Filed: Sep. 14, 2017

(86) PCT No.: PCT/CN2017/101724
§ 371 (c)(1),
(2) Date: Apr. 13, 2018

(87) PCT Pub. No.: WO2018/196260
PCT Pub. Date: Nov. 1, 2018

(65) Prior Publication Data
US 2020/0260067 A1 Aug. 13, 2020

(30) Foreign Application Priority Data
Apr. 25, 2017 (CN) .......................... 201710275544.2

(51) Int. Cl.
H04N 13/31 (2018.01)
G02B 30/26 (2020.01)
G02B 26/08 (2006.01)

(52) U.S. Cl.
CPC ......... H04N 13/31 (2018.05); G02B 26/0875 (2013.01); G02B 30/26 (2020.01)

(58) Field of Classification Search
CPC ..... H04N 13/31; G02B 30/26; G02B 26/0875
See application file for complete search history.

(56) References Cited

U.S. PATENT DOCUMENTS

2010/0073463 A1* 3/2010 Momonoi .............. H04N 13/31
348/47
2010/0085512 A1 4/2010 Ueda et al.
(Continued)

FOREIGN PATENT DOCUMENTS

CN 101713888 A 5/2010
CN 102141714 A 8/2011
(Continued)

OTHER PUBLICATIONS

First Office Action in the Chinese Patent Application No. 201710275544.
2, dated Sep. 24, 2019; English translation attached.

Primary Examiner — Nasim N Nirjhar
(74) Attorney, Agent, or Firm — Intellectual Valley Law, P.C.

(57) ABSTRACT

The present application discloses a display apparatus including a display panel including a plurality of subpixels. Each subpixel comprises a first region for displaying a subpixel image. The display apparatus further includes a plurality of pixel adjustors each of which is configured to adjust the first region of a corresponding one subpixel to display an initial subpixel image. Additionally, the display apparatus includes a plurality of optical elements at a first side of the display panel. Each of the plurality of optical elements is associated with at least one subpixel to generate a virtual subpixel image at a second side of the display panel corresponding to the initial subpixel image displayed by the at least one subpixel. Each of the plurality of optical elements independently controls a distance of the virtual subpixel image relative to the display panel and the second side is opposite to the first side.

20 Claims, 5 Drawing Sheets (56) References Cited

U.S. PATENT DOCUMENTS

| | | | | |
|---|---|---|---|---|
| 2011/0044046 A1* | 2/2011 | Abu-Ageel | ............... | F21K 9/68 |
| | | | | 362/259 |
| 2016/0156887 A1* | 6/2016 | Liu | ..................... | H04N 13/161 |
| | | | | 348/744 |
| 2018/0217429 A1* | 8/2018 | Busch | ................... | G02F 1/1395 |
| 2019/0035364 A1* | 1/2019 | Iwasaki | ................... | G02F 1/163 |
| 2020/0074896 A1* | 3/2020 | Kusafuka | ........... | G02B 27/0101 |

FOREIGN PATENT DOCUMENTS

| | | |
|---|---|---|
| CN | 104360533 A | 2/2015 |
| CN | 106338862 A | 1/2017 |
| WO | 2012134487 A1 | 10/2012 |

\* cited by examiner

DISPLAY APPARATUS AND A METHOD THEREOF

CROSS-REFERENCE TO RELATED APPLICATION

This application is a national stage application under 35 U.S.C. § 371 of International Application No. PCT/CN2017/101724, filed Sep. 14, 2017, which claims priority to Chinese Patent Application No. 201710275544.2, filed Apr. 25, 2017, the contents of which are incorporated by reference in the entirety.

TECHNICAL FIELD

The present invention relates to display technology, more particularly, to a display apparatus and a method thereof.

BACKGROUND

Development of three-dimensional (3D) image display technologies including 3D movie in theater, 3D television at home, and virtual-reality/augmented-reality (VR/AR) display, have been very fast and applied in many aspects of our life in recent years. The ways of displaying 3D image also are gradually improved from original red-green color-interlaced display, to polarization-interlaced stereoscopic display, to naked-eye 3D display, and further to near-eye VR/AR display.

In the conventional 3D displays, two different images with different view-angles are respectively provided to two eyes of a viewer so that the viewer can obtain a 3D image effect through human brain synthesis of the two different images. If only a single eye is used to view, the viewer cannot see different monocular depths of field. Viewing these conventional 3D displays for long time may cause a sense of human vertigo.

SUMMARY

In an aspect, the present disclosure provides a display apparatus. The display apparatus includes a display panel including a plurality of subpixels. Each subpixel includes a first region for displaying a subpixel image. Additionally, the display apparatus includes a plurality of pixel adjustors each of which is configured to adjust the first region of a corresponding one of the plurality of subpixels to display an initial subpixel image. Further, the display apparatus includes a plurality of optical elements at a first side of the display panel. Each of the plurality of optical elements is associated with at least one subpixel to generate a virtual subpixel image at a second side of the display panel corresponding to the initial subpixel image displayed by the at least one subpixel. At least two virtual subpixel images are at different distances relative to the display panel. The second side is opposite to the first side.

Optionally, each of the plurality of optical elements includes a lens with a tunable focal length.

Optionally, each of the plurality of optical elements is configured to independently control the distance of the virtual subpixel image relative to the display panel.

Optionally, the plurality of optical elements is configured to have respective orthographic projections on the display panel coinciding with the plurality of subpixels.

Optionally, each optical element combined with at least one of the plurality of pixel adjustors is configured to adjust the initial subpixel image of a corresponding subpixel and to generate a virtual subpixel image with an area substantially up to a total displayable region of the corresponding subpixel.

Optionally, the display panel is a passive type and the display apparatus further includes a light source configured to provide illumination for the plurality of subpixels in the display panel. The light source includes a plurality of light-emitting elements respectively corresponding to the plurality of pixel adjustors in a one-to-one correspondence relationship.

Optionally, one of the plurality of pixel adjustors is configured to guide light from one corresponding light-emitting element to illuminate the first region of the at least one subpixel to display the initial subpixel image. One corresponding optical element is configured to adjust the initial subpixel image to generate the virtual subpixel image with an area substantially up to a total displayable region of the at least one subpixel.

Optionally, each of the plurality of optical elements is disposed at a same distance at the first side of the display panel.

Optionally, each of the pixel adjustors includes a lens structure.

Optionally, each of the pixel adjustors and the optical elements includes a convex lens structure. Some convex lens structures of some of the optical elements have different focal lengths for generating respective virtual subpixel images having different distances relative to the display panel. The same distance of each optical element relative to the display panel is smaller than the focal length of the convex lens structure of the optical element.

Optionally, the display apparatus further includes a light deflecting element coupled to each pixel adjustor for guiding light exited from one pixel adjustor to illuminate at least the first region of one subpixel in the display panel.

Optionally, the light deflecting element includes a first reflection plate and a second reflection plate forming an angle greater than 0 degrees such that the light exited from one pixel adjustor is reflected by the first reflection plate to reach the second reflection plate and is further reflected by the second reflection plate to reach the at least one subpixel in the display panel.

Optionally, each subpixel in the display panel includes an organic light emitting layer. Each of the plurality of pixel adjustors includes an aperture structure disposed between a corresponding subpixel and a corresponding optical element at the first side of the display panel.

Optionally, each of the plurality of pixel adjustors includes Micro-Electro-Mechanical Systems (MEMS) controlled microlens for independently adjusting the aperture structure to adjust the first region of the corresponding subpixel for displaying the initial subpixel image. The corresponding optical element is configured to enlarge the initial subpixel image to generate a virtual subpixel image having an area substantially up to a total displayable region of the subpixel and independently control a distance of the virtual subpixel image at the second side relative to the display panel.

In another aspect, the present disclosure provides a display apparatus configured for displaying virtual reality images. The display apparatus includes a first display panel including a first plurality of subpixels and a second display panel including a second plurality of subpixels. Each subpixel includes a first region for displaying a subpixel image. Additionally, the display apparatus includes a first plurality of pixel adjustors each of which is configured to adjust the first region of a corresponding one of the first plurality of subpixels to display a first initial subpixel image. The display apparatus further includes a second plurality of pixel adjustors each of which is configured to adjust the first region of a corresponding one of the second plurality of subpixels to display a second initial subpixel image. Furthermore, the display apparatus includes a first plurality of optical elements at a first side of the first display panel. Each of the first plurality of optical elements is associated with at least one subpixel of the first plurality of subpixels to generate a first virtual subpixel image at a second side of the first display panel corresponding to the first initial subpixel image. Moreover, the display apparatus includes a second plurality of optical elements at a first side of the second display panel. Each of the second plurality of optical elements is associated with at least one subpixel of the second plurality of subpixels to generate a second virtual subpixel image at a second side of the second display panel corresponding to the second initial subpixel image. Each of the first plurality of optical elements independently controls a first distance of the first virtual subpixel image relative to the first display panel. Each of the second plurality of optical elements independently controls a second distance of the second virtual subpixel image relative to the second display panel. The first side of the first display panel is opposite to the second side of the first display panel. The first side of the second display panel is opposite to the second side of the second display panel. A first virtual image combined all the first virtual subpixel images associated with the first plurality of subpixels in the first display panel is provided to a left eye of a viewer and a second virtual image combined all the second virtual subpixel images associated with the second plurality of subpixels in the second display panel is provided to a right eye of the viewer, each of the first virtual image and the second virtual image being viewed at a same time as a 3D virtual image.

Optionally, the first display panel and the second display panel are provided together in a helmet or glasses.

In another aspect, the present disclosure provides a method of generating a 3D virtual image based on a display panel including a plurality of subpixels. The method includes individually adjusting a first region of a corresponding one of the plurality of subpixels to display an initial subpixel image on the display panel and individually generating a virtual subpixel image of the initial subpixel image of the corresponding one of the plurality of subpixels at a distance relative to the display panel. At least two virtual subpixel images are at different distances relative to the display panel.

Optionally, the individually adjusting a first region of a corresponding one of the plurality of subpixels includes using a lens structure connected with a light source to guide light from the light source to illuminate the first region of the corresponding one of the plurality of subpixels for displaying the initial subpixel image.

Optionally, the individually adjusting a first region of a corresponding one of the plurality of subpixels includes using Micro-Electro-Mechanical Systems (MEMS) to independently adjust an aperture size of a microlens placed over the corresponding one subpixel with an active light-emitting element, the aperture size corresponding to the first region of the corresponding one subpixel.

Optionally, the individually generating a virtual subpixel image includes using a convex lens structure disposed at a first side of the display panel with a focal length larger than a fixed distance of the convex lens structure relative to the display panel to adjust the initial subpixel image such that the virtual subpixel image at a second side of the display panel has an area substantially equal to the first region of the corresponding one of the plurality of subpixels, wherein the focal length of the convex lens structure is tunable to control the distance of each virtual subpixel image relative to the display panel, wherein the second side is opposite to the first side.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Based on conventional 3D display technology, each single eye of a viewer cannot see different depths of field of an image. In other words, a single eye of the viewer cannot see true 3D effect which is only a result of brain synthesis of two images with different view-angles but a same depth received by two eyes, leading to a human vertigo for viewer of viewing these conventional 3D displays.

Accordingly, the present disclosure provides, inter alia, a display apparatus and a method for providing virtual images with controlled distances relative to a corresponding display panel to allow viewer to see true 3D effect images that substantially obviate one or more of the problems due to limitations and disadvantages of the related art.

Figure 1:
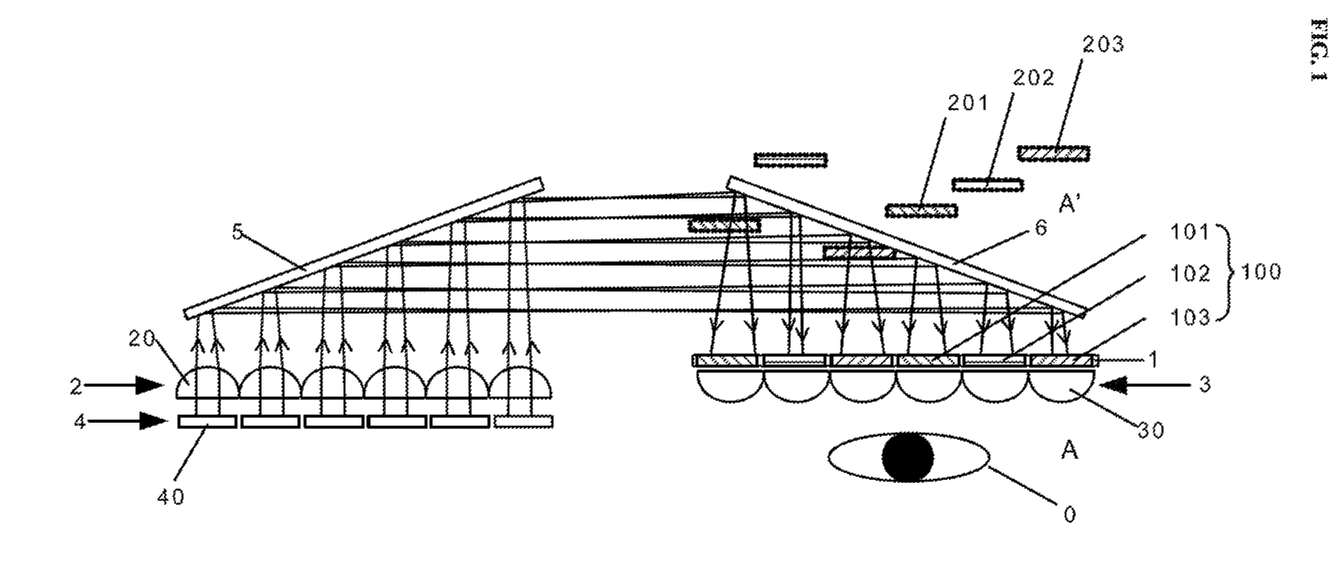
FIG. 1 is a schematic diagram showing a structure of a virtual image display apparatus according to some embodiments of the present disclosure.
Figure 2:
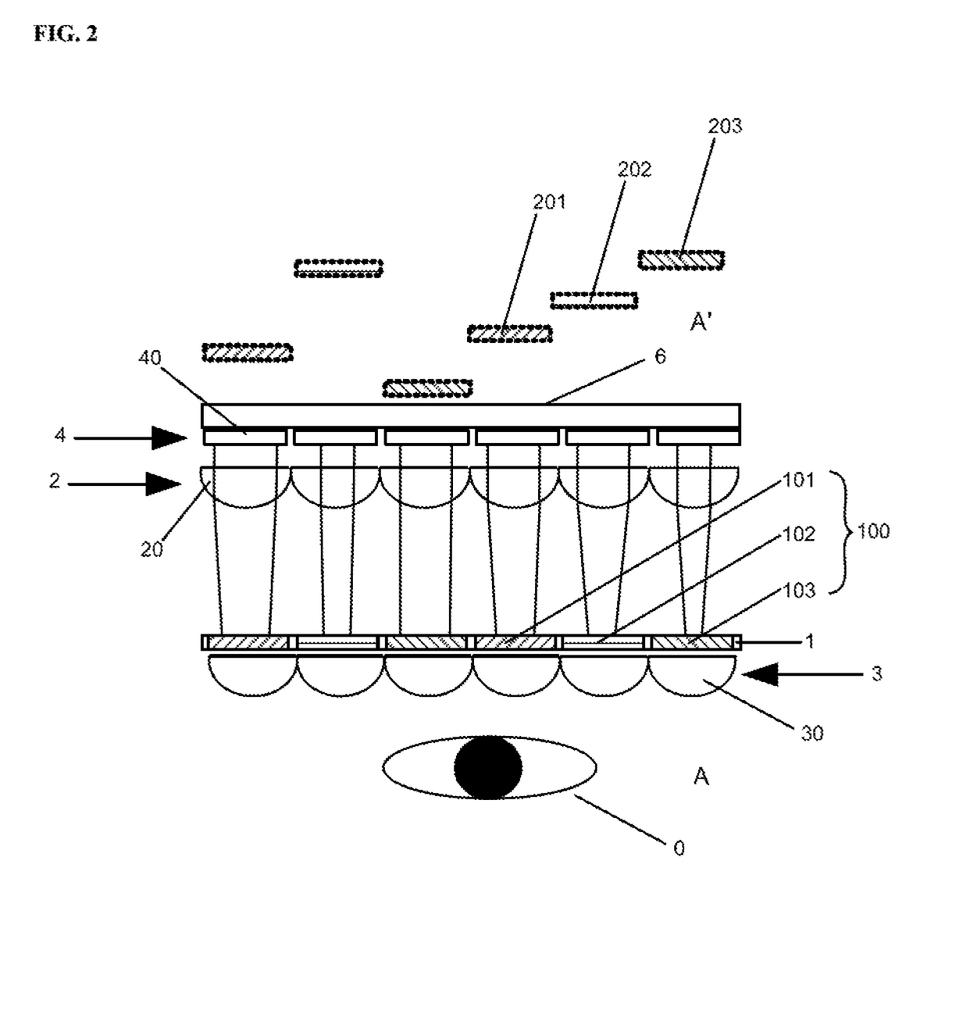
FIG. 2 is a schematic diagram showing a structure of a virtual image display apparatus according to some other embodiments of the present disclosure.
Figure 3:
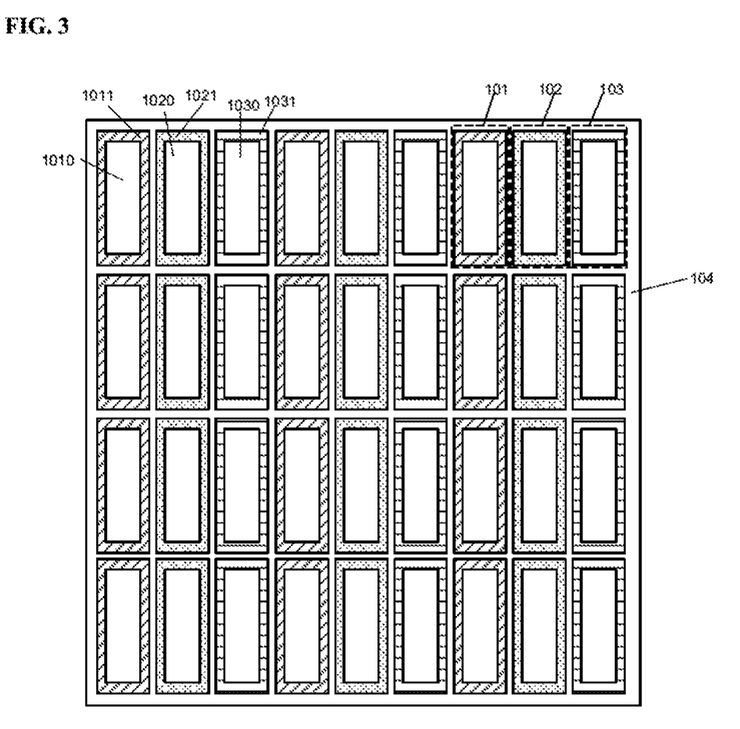
FIG. 3 is a schematic diagram of an array of subpixels arranged in a display panel according to some embodiments of the present disclosure.

In one aspect, the present disclosure provides a display apparatus. FIG. 1 and FIG. 2 are schematic diagrams showing the display apparatus according to some embodiments of the present disclosure. Referring to FIG. 1 and FIG. 2, the display apparatus includes a display panel 1. The display panel 1 includes multiple pixels 100. Each pixel 100 includes multiple subpixels, such as a red subpixel 101, a green subpixel 102, and a blue subpixel 103. A black matrixes 104 or a pixel define layer 104 defines a plurality of subpixels. FIG. 3 shows a schematic diagram of an array of subpixels arranged in a display panel according to some embodiments of the present disclosure. In the embodiments, the display panel is a passive type which does not contain light-emitting layer by itself. For example, the display panel is a liquid crystal display. Each subpixel represents a displayable region for displaying a subpixel image. In the present disclosure, a portion of the displayable region is used for displaying an image. Referring to FIG. 3, each subpixel comprises a first region and a second region. The first region takes a portion of the displayable region of the subpixel for displaying a subpixel image. The second region represents a remaining portion of the subpixel not used. For example, a red subpixel 101 includes a red first region 1010 and a red second region 1011. Similarly, a green subpixel 102 includes a green first region 1020 and a green second region 1021. A blue subpixel 103 includes a blue first region 1030 and a blue second region 1031. In other words, the first region of each subpixel is adjustable from a total area of the displayable region of the subpixel to a reduced area in the subpixel. The second region is reduced to zero when the first region is enlarged to the total area of the displayable region. Each (red, blue, green) first region of each subpixel is used to display an initial subpixel image. In particular, the first region is the area that is illuminated by light from a back light source for displaying a (red, blue, green) subpixel image. Each (red, blue, green) second region is not used for displaying the (red, blue, green) subpixel image.

Referring to FIG. 1, the display apparatus also includes an adjustment component 2 which is a plurality of pixel adjustors 20. Each of the plurality of pixel adjustors is configured to adjust the first region of a corresponding one of a plurality of subpixels in the display panel 1. In particular, each pixel adjustor 20 is to adjust an area of the first region of a corresponding subpixel to achieve an adjustment of the subpixel image to form an initial subpixel image. Optionally, the area of the first region is reduced, forming an initial subpixel image with a reduced area smaller than a subpixel image displayed by total area of displayable region. This allows a possibility of forming virtual subpixel images with different viewing depths.

Referring to FIG. 1 again, the display apparatus includes an imaging component 3 which is a plurality of optical elements 30 disposed at a first side A of the display panel 1. The first side A is also called a display side or a side for a viewer's eye 0 to view images provided by the display apparatus. Each optical element 30 corresponds one-to-one to locations of at least one subpixel. A virtual subpixel image can be generated by an optical element 30 based on a corresponding one initial subpixel image. For example, in FIG. 1 and FIG. 2, a virtual image 201 is generated based on an initial subpixel image associated with a red subpixel. Another virtual subpixel image 202 is generated based on an initial subpixel image associated with a green subpixel. Yet another virtual subpixel image 203 is generated based on an initial subpixel image associated with a blue subpixel. All the virtual subpixel images are formed at a second side A' of the display panel. The second side A' is an opposite side of the display panel relative to the first side A. In some embodiments, each optical element 30 is configured to independently control a distance of the virtual image relative to the display panel. The display apparatus provides a virtual image that is combined all virtual subpixel images respectively associated with the plurality of subpixels in the display panel for the viewer's eye 0 to view from the display side.

Referring to FIG. 1, each optical element 30 is, by coupling with the adjustment component 2, configured to shrink or enlarge each corresponding initial subpixel image provided by a corresponding subpixel so that an area of the virtual subpixel image generated by the optical element 30 is equal to an area that is less than or equal to the total area of the displayable region. Preferably, the virtual subpixel image generated by the optical element is equal to the total area of the displayable region which is the largest physical area of a subpixel designed for displaying image. The optical element 30 is configured to enlarge the initial subpixel image provided by a first region of a corresponding subpixel to generate the virtual subpixel image having an area up to the displayable region, ensuring the best virtual image quality of the display apparatus.

In some embodiments, the adjustment component 2 of the display apparatus includes various kinds of optical components that are selected depending on types of the display panel. As shown in FIG. 1, the display panel 1 is a passive type which does not contain light-emitting layer by itself. For example, the display panel is a liquid crystal display. Associated with this type of display panel 1, the display apparatus also includes a light source 4 for providing light required for illuminating the display panel 1. The light source 4 includes a plurality of light-emitting elements 40. Each light-emitting element 40 is formed with a certain gap separated from an adjacent light-emitting element.

Additionally corresponding to the passive type of display panel 1, each pixel adjustor 20 is installed to correspond to a corresponding location of a light-emitting element 40 in a one-to-one relationship. For example, a pixel adjustor is a focal lens placed in front of optical path of a corresponding light-emitting element for guiding light from the corresponding light-emitting element. The focal lens has a size compatible to the size of the light-emitting element with a proper distance between them such that the light from the particular one light-emitting element is substantially exclusively guided by one corresponding adjustor. Thus, each pixel adjustor 20 is able to individually adjust the area of the first region of a corresponding subpixel for forming an initial subpixel image out of the adjusted first region. In particular, light from a light-emitting element 40 is guided by a corresponding one pixel adjustor 20 to illuminate onto a partial area of the corresponding displayable region. Optionally, the light-emitting element 40 emits collimation light substantially perpendicular to the display panel 1. Since the display panel is a passive type, the illuminated area is the area of the first region that is actually used for displaying a subpixel image as an initial subpixel image. The first region is no greater than total area of the displayable region. In an embodiment, the size of the illuminated area is controllably adjusted by the corresponding pixel adjustor 20. In another embodiment, each pixel adjustor 20 is configured to guide light from one light-emitting element 40 to illuminate an area in one subpixel and not overlapped with other adjacent subpixel.

In an alternative embodiment, each pixel adjustor 20 is configured to guide light from one light-emitting element 40 to illuminate multiple subpixel displayable regions for adjusting the first regions of multiple subpixels at the same time.

Referring to FIG. 1, each pixel adjustor 20 includes a lens structure aligned with a corresponding light-emitting element 40 for guiding the light out of thereof. Optionally, the lens structure is a single lens per adjustor. Optionally, the lens structure is a liquid crystal lens. Optionally, the lens is a convex one to gather light to a smaller area for facilitating the adjustment of the first region by reducing its illuminated area. Optionally, the lens structure has a tunable focal length to allow individual adjustment of the first region of different subpixels.

In some embodiments, in order to reduce the thickness of the display apparatus, the display apparatus further includes a light deflecting element for changing the propagation path of the light emitted from the light-emitting elements to project to the first region of the corresponding subpixel in the display panel. Depending on embodiments, the display apparatus may include a light deflection element with a pair of reflection plates 5 and 6 for coupling with the adjustment component 2, light source 4 to properly guide light towards respective a plurality of subpixels in the display panel 1 in a certain configuration of the display apparatus. FIG. 1 shows an example that the display panel 1 is disposed sideway next to the light source 4. In this configuration, a first reflection plate 5 is placed with an angle in the pathway of light being guided through the plurality of pixel adjustors 20 (i.e., a plurality of lens) to reflect the light to the sideway. A second reflection plate 6 is placed according with an angle (≠0) relative to the first reflection plate 5 to further reflect the incoming light from the reflection plate 5 toward the display panel 1. Of course, other light deflecting element in other configurations may be included depending on configuration of the display apparatus. Optionally, all the light deflection elements are merely for changing light propagation path, not changing illumination area and color of light.

In an alternative embodiment shown in FIG. 2, the light source 4 including a plurality of light-emitting elements 40 is disposed at a position directly facing the display panel 1. Optionally, the light-emitting element 40 emits collimation light substantially perpendicular to the display panel 1. In this configuration, a single reflection plate 6 may be installed behind the light source 4 for direct reflecting the (any possible leaking) light from the light-emitting elements 40 toward the display panel 1. Optionally, the reflection plate 6 can be removed. Of course, other light-reflection elements in other configurations may be included or changed depending on configuration of the display apparatus.

Referring to FIG. 1 and FIG. 2, each of the plurality of optical elements 30 includes a lens structure disposed at a distance away from the display panel 1 at the display side (or, a first side A) which is the side for a viewer's eye 0 to see the image displayed by the display apparatus. Optionally, the lens structure is a single lens per optical element. Optionally, the lens structure is a convex lens for generating a virtual image of an object at the same side of the lens. In particular, the distance of the optical element 30 relative to the display panel 1 is smaller than a focal length f selected for the convex lens in the optical element 30. This allows the lens to form a virtual subpixel image as an upright enlarged image based on an initial subpixel image at a corresponding subpixel in the display panel 1. Both the virtual subpixel image and the initial subpixel image are located at the second side A' of the display panel 1. The second side A' is an opposite side of the first side A. For example, a virtual subpixel image 201 is formed based on the initial subpixel image in a red subpixel 101 in the display panel 1. A virtual subpixel image 202 is formed based on the initial subpixel image in a green subpixel 102. A virtual subpixel image 203 is formed based on the initial subpixel image in a blue subpixel 103. Each virtual subpixel image generated by a corresponding optical element 30 is substantially equal to a total area of the displayable region of the corresponding subpixel.

Based on the convex lens imaging principle, the distance μ between the display panel 1 and an optical element 30 and the distance v between the virtual subpixel image and the optical element 30 satisfies a following relationship:

$$\frac{1}{\mu} + \frac{1}{V} = \frac{1}{f}.$$

The area s1 of the virtual subpixel image and the area s2 of the first region of the subpixel have a relationship of:

$$\frac{s2}{s1} = \frac{\mu^2}{v^2}.$$

In an embodiment, some of the plurality of optical elements 30 have different focal length f so that some virtual subpixel images among all virtual subpixels generated based on all subpixels in the display panel 1 have different distances relative to the display panel 1. This allows a viewer to see a virtual image with different depths of field even if it is viewed by a single eye 0, resulting in a true 3D display.

Optionally, the lens structure in both the pixel adjustor 20 and the optical element 30 is a liquid crystal lens. The display apparatus can include a control device configured to control focal length of the lens in the pixel adjustor 20 to control how much the pixel adjustor 20 to reduce the first region to obtain the initial subpixel image. The control device also can be configured to control focal length of the lens in the optical element 30 to control the magnification of the virtual subpixel image and distance of it relative to the display panel 1. This allows the display apparatus to have ability of individually adjusting the first region of each subpixel to generate a virtual subpixel image that has an area equal to the total area of the displayable region and has its distance relative to the display panel not exactly the same as other virtual subpixel images. Then this display apparatus can provide a virtual image with different depths of field as a true 3D display with good subpixel image quality.

Optionally, the focal length of the liquid crystal lens is configured to be tunable and easy to control. The focal lengths of individual pixel adjustor 20 and individual optical element 30 can be tuned based on different 3D images to be displayed to achieve improved display quality.

Figure 4:
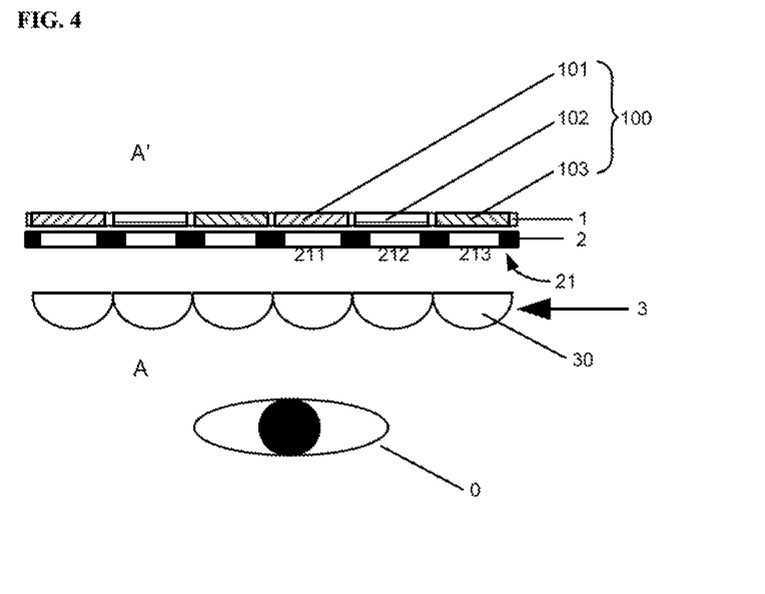
FIG. 4 is a schematic diagram showing a structure of a virtual image display apparatus according to some alternative embodiments of the present disclosure.

FIG. 4 is a schematic diagram showing a structure of a virtual image display apparatus according to some alternative embodiments of the present disclosure. As shown, the display panel 1 is an active type including a light-emitting material for each subpixel itself. For example, the display panel is an organic light emitting diode display panel. For this type of display panel, a plurality of pixels having multiple subpixels is still arranged in array of matrix as shown in FIG. 3. Each subpixel comprises a first region for displaying a subpixel image. The first region is a portion of the displayable region and can be adjusted to a smaller area for displaying an initial subpixel image having a reduced area. In some embodiments, the adjustment component 2 is configured differently to dispose between the display panel 1 and the imaging component 3 at a more proximal distance relative to the display panel 1. The adjustment component 2 is configured to adjust the first region of each subpixel to form an initial subpixel image having a smaller area based on the adjusted first region. The imaging component 3 includes a plurality of optical element 30 configured to respectively enlarge the initial subpixel images to generate corresponding virtual subpixel images having an area that is up to the total displayable regions of the corresponding subpixels and having different distances relative to the display panel 1. Combining all the virtual subpixel images having various distances relative to the display panel, the display apparatus is to provide a virtual image for a viewer at the other side of the imaging component 3. The viewer is able to see various depths of field of a true 3D image even for a single eye 0.

Referring to FIG. 4, the adjustment component 2 includes a plurality of aperture structures 21. Each aperture structure 21 is aligned one-by-one with a corresponding subpixel in the display panel. Each subpixel is supposed to self-emit light in its total displayable region. The aperture structure 21 is to provide a mechanism to reduce an area of passing the emitted light from each subpixel in a one-to-one correspondence relationship. For example, an aperture 211 is set at a position corresponding to a red subpixel 101. Another aperture 212 is set at a position of a green subpixel 102. Another aperture 213 is set at a position of a blue subpixel 103. In other words, the aperture itself acts as a first region of the subpixel. Adjusting the first region of the subpixel to obtain an initial subpixel image is adjusting a size of the aperture structure 21 to effectively obtain an initial subpixel image with a reduced area displayed by the subpixel.

Optionally, each of the plurality of aperture structures 21 includes Micro-Electro-Mechanical Systems (MEMS) controlled microlens for independently adjusting the size of the aperture structure 21 to adjust the first region of the corresponding subpixel for displaying the initial subpixel image. The microlens are controlled their motions through static-electrical force or electromagnetic force to adjust the aperture size.

Optionally, the imaging component 3 includes a plurality of optical elements 30 respectively corresponds to the plurality of aperture structures 21. Optionally, each optical element 30 includes a lens. Optionally, the lens is a convex lens with a focal length larger than a distance of the corresponding optical element relative to the display panel 1, for generating virtual image of an object at a same side of the object. In the embodiment, the object that the optical element 30 applied for is the initial subpixel image provided by the corresponding aperture structure 21. The optical element 30, using the convex lens, is configured to enlarge the initial subpixel image to generate a virtual subpixel image having an area substantially up to a total displayable region of the subpixel to at least avoid crosstalk occurring between adjacent subpixels or avoid gap appearing between adjacent subpixels, and the convex lens is configured to independently control a distance of the virtual subpixel image relative to the display panel.

Optionally, the optical element 30 includes a lens that has a tunable focal length for easy controlling the distance of individual virtual subpixel image.

In another aspect, the present disclosure provides a naked-eye 3D display apparatus. In some embodiments, the naked-eye 3D display apparatus includes all elements of the feature display apparatus described herein and also includes a parallax baffle. The display panel includes a first sub-set of subpixels designed for left eye of a viewer and a second sub-set of subpixels designed for right eye of the viewer. The displayed images associated with the first sub-set of subpixels are passed through the parallax baffle to only reach the left eye and the displayed images associated with the second sub-set of subpixels are passed through the parallax baffle to only reach the right eye so that a 3D effect image is seen by the viewer. Specifically, each of the displayed images from either the first sub-set or the second sub-set of subpixels is a virtual subpixel image generated by an optical element of the display apparatus. This optical element is configured to control the distance of the virtual subpixel image relative to the viewer. As some virtual subpixel images have not exactly the same distance relative to the viewer, the viewer can see different depths of field associated with different virtual subpixel images. Even with single eye, the viewer can see 3D effect image.

Figure 5:
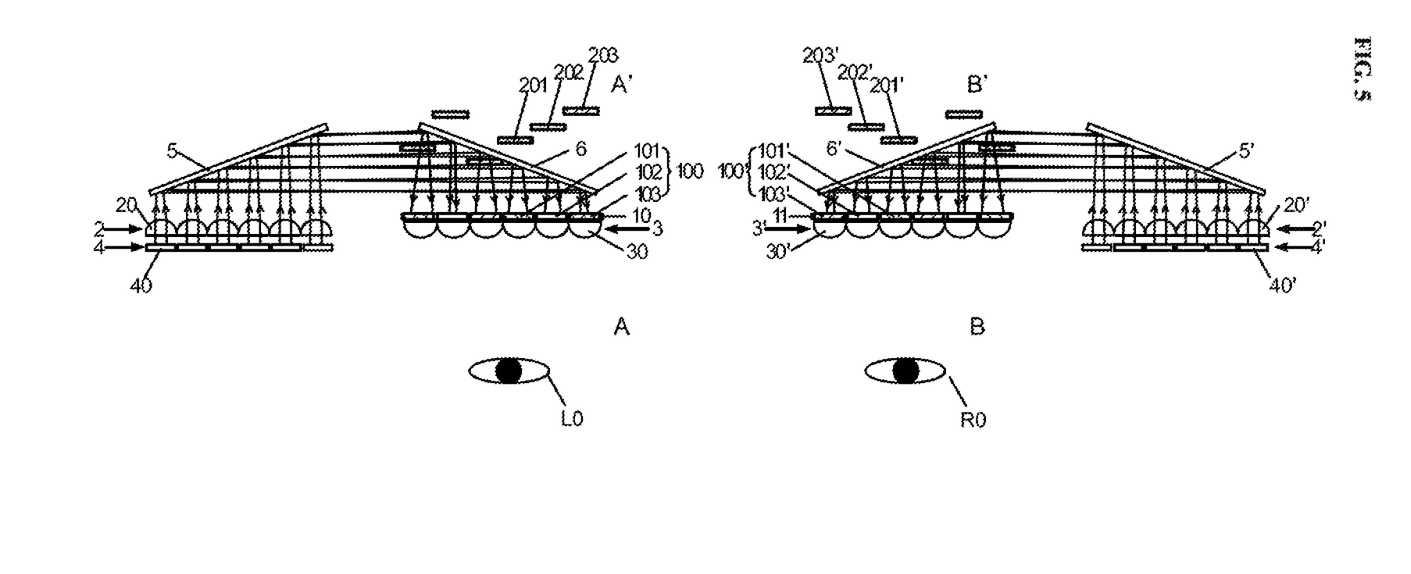
FIG. 5 is a schematic diagram of a virtual image display apparatus according to some embodiments of the present disclosure.

In another aspect, the present disclosure also provides a VR/AR display apparatus in a format of a near-eye 3D display device. FIG. 5 is a schematic diagram of a virtual image display apparatus as virtual display glasses according to some embodiments of the present disclosure. Referring to FIG. 5, the display apparatus includes a first display panel 10 including a first plurality of subpixels (e.g., 101, 102, 103) and a second display panel 11 including a second plurality of subpixels (e.g., 101', 102', 103'). Each subpixel in either display panel comprises a first region for displaying a subpixel image. The display apparatus also includes a first plurality of pixel adjustors 20, each of which is configured to adjust the first region of a corresponding one of the first plurality of subpixels to display a first initial subpixel image. The display apparatus also includes a second plurality of pixel adjustors 20', each of which is configured to adjust the first region of a corresponding one of the second plurality of subpixels to display a second initial subpixel image. Additionally, the display apparatus includes a first plurality of optical elements 30 at a first side A of the first display panel 10, each of the first plurality of optical elements 30 is associated with at least one subpixel of the first plurality of subpixels to generate a first virtual subpixel image (e.g., 201, 202, 203) at a second side A' of the first display panel 10 corresponding to the first initial subpixel image. The display apparatus also includes a second plurality of optical elements 30' at a first side B of the second display panel 11, each of the second plurality of optical elements 30' is associated with at least one subpixel of the second plurality of subpixels to generate a second virtual subpixel image (e.g., 201', 202', 203') at a second side B' of the second display panel 11 corresponding to the second initial subpixel image. Each of the first plurality of optical elements 30 independently controls a first distance of the first virtual subpixel image (201, 202, 203) relative to the first display panel 10. Each of the second plurality of optical elements 30' independently controls a second distance of the second virtual subpixel image (201', 202', 203') relative to the second display panel 11. The first side A of the first display panel 10 is opposite to the second side A' of the first display panel 10. The first side B of the second display panel 11 is opposite to the second side B' of the second display panel 11. The first side A of the first display panel 10 is the same side as the first side B of the second display panel 11. The second side A' of the first display panel 10 is the same side as the second side B' of the second display panel 11. A first virtual image combined all the first virtual subpixel images associated with the first plurality of subpixels in the first display panel is provided to a left eye L0 of a viewer and a second virtual image combined all the second virtual subpixel images associated with the second plurality of subpixels in the second display panel is provided to a right eye R0 of the viewer. Optionally, the first virtual image and the second virtual image are viewed at a same time as a 3D virtual image respectively from a first viewing area and a second viewing area of glasses wore by the viewer. Optionally, the first virtual image and the second virtual image are viewed at a same time as a 3D virtual image respectively from a first viewing area and a second viewing area of helmet wore by the viewer.

Figure 6:
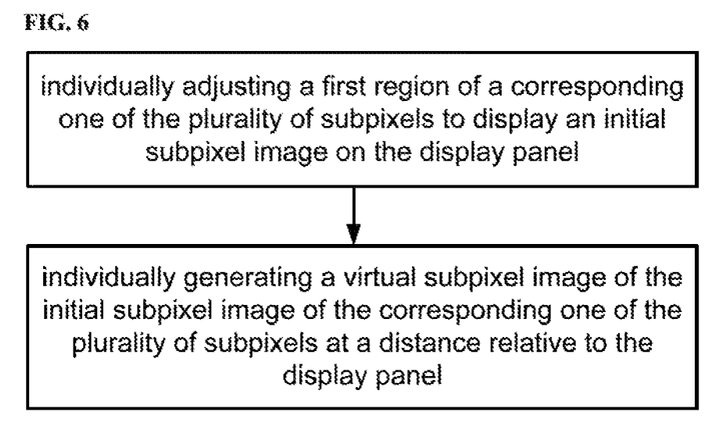
FIG. 6 is a flow chart showing a method for generating a 3D virtual image according to some embodiments of the present disclosure.

In another aspect, the present disclosure provides a method for generating a 3D virtual image. As shown in FIG.

6, the method includes individually adjusting an initial subpixel image formed partially in a displayable region of a subpixel in a display panel. The initial subpixel image is used as an object for forming a virtual subpixel image. The initial subpixel image with a reduced area allows various initial subpixel images can be enlarged independently to form corresponding virtual subpixel images with different magnifications to have an area up to the total display area of each subpixel region. The method also includes individually controlling an area of a virtual subpixel image generated based on the initial subpixel image and a distance of the virtual subpixel image relative to the display panel.

In some embodiments, the method of individually adjusting the initial subpixel image includes using a lens structure connected with a light source to illuminate a reduced area of the displayable region per subpixel for displaying the initial subpixel image.

In some embodiments, the method of the individually controlling the area of the virtual subpixel image includes using a convex lens structure with a focal length larger than a fixed distance of the lens structure relative to the display panel at a display side to enlarge the initial subpixel image displayed by the reduced area so that the area of the virtual subpixel image is substantially equal to the displayable region. Some virtual subpixel images are controlled to have different distances relative to the display panel.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus comprising:
    a display panel including a plurality of subpixels respectively comprising a plurality of subpixel areas;
    a plurality of pixel adjustors configured to respectively adjust a plurality of first regions respectively of the plurality of subpixel areas, to limit image display of a plurality of initial subpixel images respectively in the plurality of first regions of the plurality of subpixels, and absent in remaining regions respectively of the plurality of subpixel areas;
    a plurality of optical elements at a first side of the display panel configured to respectively generate a plurality of virtual subpixel images at a second side of the display panel based on the plurality of initial subpixel images displayed respectively by the plurality of first regions, a respective one of the plurality of optical elements being associated with at least one of the plurality of first regions in at least one of the plurality of subpixel regions;
    wherein the plurality of optical elements are configured to generate the plurality of virtual subpixel images respectively at a plurality of distances relative to the display panel, the plurality of distances negatively correlated to areas of the plurality of first regions, areas of the plurality of virtual subpixel images are respectively substantially same as the plurality of subpixel areas;
    at least two virtual subpixel images of the plurality of virtual subpixel images are at different distances relative to the display panel;
    an area of a respective one of the plurality of first regions is tunable between zero and an area of a respective one of the plurality of subpixel areas; and
    the second side is opposite to the first side.

2. The display apparatus of claim 1, wherein each of the plurality of optical elements comprises a lens with a tunable focal length.

3. The display apparatus of claim 1, wherein each of the plurality of optical elements is configured to independently control a distance of a respective one of the plurality of virtual subpixel images relative to the display panel.

4. The display apparatus of claim 1, wherein the plurality of optical elements are configured to have respective orthographic projections on the display panel coinciding with the plurality of subpixels.

5. The display apparatus of claim 4, wherein each optical element combined with at least one of the plurality of pixel adjustors is configured to generate a respective one of the plurality of virtual subpixel images with an area substantially up to a total displayable region of the respective one of the plurality of subpixel areas.

6. The display apparatus of claim 1, wherein the display panel is a passive type, further comprising a light source configured to provide illumination for the plurality of subpixels in the display panel, wherein the light source comprises a plurality of light-emitting elements respectively corresponding to the plurality of pixel adjustors in a one-to-one correspondence relationship.

7. The display apparatus of claim 6, wherein a respective one of the plurality of pixel adjustors is configured to guide light from one corresponding light-emitting element to illuminate the respective one of the plurality of first regions to display a respective one of the plurality of initial subpixel, the respective one of the plurality of optical elements being configured to generate the respective one of the plurality of initial subpixel images with an area substantially up to a total displayable region of the respective one of the plurality of subpixel areas.

8. The display apparatus of claim 1, wherein each of the plurality of optical elements is disposed at a same distance at the first side of the display panel.

9. The display apparatus of claim 1, wherein each of the plurality of pixel adjustors comprises a lens structure.

10. The display apparatus of claim 9, wherein each of the plurality of pixel adjustors comprises a convex lens structure, each of the plurality of optical elements also comprises a convex lens structure, multiple convex lens structures of multiple ones of the plurality of optical elements having different focal lengths for generating respective virtual subpixel images having different distances relative to the display panel, a distance of the respective one of the plurality of optical elements relative to the display panel being smaller than a focal length of a convex lens structure of the respective one of the plurality of optical elements.

11. The display apparatus of claim 1, further comprising a light deflecting element coupled to each pixel adjustor for guiding light exited from one pixel adjustor to illuminate at least the respective one of the plurality of first regions in the display panel.

12. The display apparatus of claim 11, wherein the light deflecting element includes a first reflection plate and a second reflection plate forming an angle greater than 0 degrees such that the light exited from one pixel adjustor is reflected by the first reflection plate to reach the second reflection plate and is further reflected by the second reflection plate to reach the respective one of the plurality of subpixels in the display panel.

13. The display apparatus of claim 1, wherein each subpixel in the display panel comprises an organic light emitting layer, each of the plurality of pixel adjustors comprises an aperture structure disposed between a corresponding subpixel and a corresponding optical element at the first side of the display panel.

14. The display apparatus of claim 13, wherein the plurality of pixel adjustors comprises Micro-Electro-Mechanical Systems (MEMS) controlled microlens for independently adjusting the aperture structure to adjust a respective one of the plurality of first regions for displaying a respective one of the plurality of initial subpixel images, the corresponding optical element is configured to enlarge the respective one of the plurality of initial subpixel images to generate a virtual subpixel image having an area substantially up to a total displayable region of the respective one of the plurality of subpixel areas and independently control a distance of the virtual subpixel image at the second side relative to the display panel.

15. A display apparatus configured for displaying virtual reality images comprising:
a first display panel including a plurality of first subpixels respectively comprising a plurality of first subpixel areas;
a second display panel including a plurality of second subpixels respectively comprising a plurality of second subpixel areas;
a plurality of first pixel adjustors configured to respectively adjust a plurality of first regions respectively of the plurality of first subpixel areas, to limit image display of a plurality of first initial subpixel images respectively in the plurality of first regions of the plurality of first subpixels, and absent in remaining regions respectively of the plurality of first subpixel areas;
a plurality of second pixel adjustors configured to respectively adjust a plurality of second regions respectively of the plurality of second subpixel areas, to limit image display of a plurality of second initial subpixel images respectively in the plurality of second regions of the plurality of second subpixels, and absent in remaining regions respectively of the plurality of second subpixel areas;
a plurality of first optical elements at a first side of the first display panel configured to respectively generate a plurality of first virtual subpixel images at a second side of the first display panel based on the plurality of first initial subpixel images displayed respectively by the plurality of first regions, a respective one of the plurality of first optical elements being associated with at least one of the plurality of first regions in at least one of the plurality of first subpixel regions;
a plurality of second optical elements at the first side of the second display panel configured to respectively generate a plurality of second virtual subpixel images at the second side of the second display panel based on the plurality of second initial subpixel images displayed respectively by the plurality of second regions, a respective one of the plurality of second optical elements being associated with at least one of the plurality of second regions in at least one of the plurality of second subpixel regions;
wherein
plurality of first optical elements are configured to generate the plurality of first virtual subpixel images respectively at a plurality of first distances relative to the first display panel, the plurality of first distances negatively correlated to areas of the plurality of first regions, areas of the plurality of first virtual subpixel images respectively substantially same as the plurality of first subpixel areas;
the plurality of second optical elements are configured to generate the plurality of second virtual subpixel images respectively at a plurality of second distances relative to the second display panel, the plurality of second distances negatively correlated to areas of the plurality of second regions, areas of the plurality of second virtual subpixel images respectively substantially same as the plurality of second subpixel areas;
the first side of the first display panel is opposite to the second side of the first display panel;
the first side of the second display panel is opposite to the second side of the second display panel;
at least two first virtual subpixel images of the plurality of first virtual subpixel images are at different distances relative to the first display panel;
an area of a respective one of the plurality of first regions is tunable between zero and an area of a respective one of the plurality of first subpixel areas; and
at least two second virtual subpixel images of the plurality of second virtual subpixel images are at different distances relative to the second display panel;
an area of a respective one of the plurality of second regions is tunable between zero and an area of a respective one of the plurality of second subpixel areas; and
a first virtual image comprising the plurality of first virtual subpixel images is provided to a left eye of a viewer and a second virtual image comprising the plurality of second virtual subpixel images is provided to a right eye of the viewer, each of the first virtual image and the second virtual image being viewed at a same time as a 3D virtual image.

16. The display apparatus of claim 15, wherein the first display panel and the second display panel are provided together in a helmet or glasses.

17. A method of generating a 3D virtual image based on a display panel including a plurality of subpixels respectively comprising a plurality of subpixel areas, comprising:

respectively adjusting a plurality of first regions respectively of the plurality of subpixel areas by a plurality of pixel adjustors;

displaying a plurality of initial subpixel images respectively in the plurality of first regions of the plurality of subpixels, displaying of a respective one of the plurality of initial subpixel images being limited in a respective one of the plurality of first regions, and absent in remaining regions respectively of the plurality of subpixel areas; and generating a plurality of virtual subpixel images at a second side of the display panel, respectively by a plurality of optical elements at a first side of the display panel, respectively based on the plurality of initial subpixel images displayed respectively by the plurality of first regions, a respective one of the plurality of optical elements being associated with at least one of the plurality of first regions in at least one of the plurality of subpixel regions;

wherein the plurality of virtual subpixel images are generated respectively at a plurality of distances relative to the display panel, the plurality of distances negatively correlated to areas of the plurality of first regions, areas of the plurality of virtual subpixel images are respectively substantially same as the plurality of subpixel areas;

at least two virtual subpixel images of the plurality of virtual subpixel images are at different distances relative to the display panel;

an area of a respective one of the plurality of first regions is tunable between zero and an area of a respective one of the plurality of subpixel areas; and the second side is opposite to the first side.

18. The method of claim 17, wherein respectively adjusting the plurality of first regions respectively of the plurality of subpixel areas comprises using a lens structure connected with a light source to guide light from the light source to illuminate the respective one of the plurality of first regions for displaying the respective one of the plurality of initial subpixel images.

19. The method of claim 17, wherein respectively adjusting the plurality of first regions respectively of the plurality of subpixel areas comprises using Micro-Electro-Mechanical Systems (MEMS) to independently adjust an aperture size of a microlens placed over a respective one of the plurality of subpixels with an active light-emitting element, the aperture size corresponding to an area of the respective one of the plurality of first regions.

20. The method of claim 18, wherein generating a plurality of virtual subpixel images comprises using a convex lens structure disposed at the first side of the display panel with a focal length greater than a fixed distance of the convex lens structure relative to the display panel to adjust the respective one of the plurality of initial subpixel images such that the respective one of the plurality of initial subpixel images at a second side of the display panel has an area substantially equal to the area of the respective one of the plurality of first regions, wherein the focal length of the convex lens structure is tunable.

* * * * *